April 22, 1958     J. GERONDEAU     2,831,672

ELECTRIC AUTOMATIC SCALE

Filed July 19, 1955

INVENTOR

*JEAN GÉRONDEAU*

By *Linton and Linton*
ATTORNEYS

United States Patent Office 2,831,672
Patented Apr. 22, 1958

2,831,672

ELECTRIC AUTOMATIC SCALE

Jean Gérondeau, Pantin, France

Application July 19, 1955, Serial No. 523,064

Claims priority, application France July 20, 1954

3 Claims. (Cl. 265—56)

This invention relates to automatic scales of the type provided with electric actuator means.

It is the essential object of this invention to provide a scale of this general type wherein the displacement of the counterweight takes place under the control of a mechanism secured to the frame and actuated by one or more electromotors controlled in turn by quick-action switches responsive to the beam movements.

The girder-shaped counterweight is slidably mounted in the beam and carries a skew-toothed rack meshing with a helical gear wheel secured on a shaft journalled in bearings fitted in the frame.

The gearing consisting of the wheel and rack assembly is of the point-contact type and the point of engagement between the meshing teeth thereof is constantly coincident with the contact generatrix of the pitch circle or cylinder of the toothed wheel and the pitch plane of the rack.

Constructionally, this generatrix is coincident with the axis of oscillation of the beam which consists of the edge line of the knives through which the beam rests on the frame. Thus, the force whereby the counterweight is displaced will constantly pass through the axis of oscillation of the beam and its moment with respect to this axis is zero, so that this force will not interfere with the conditions of balance of the beam.

In order to afford a clearer understanding of the invention and of the manner in which the same may be carried out in the practice, reference will now be made to the accompanying drawing forming part of this specification and illustrating diagrammatically by way of example one form of embodiment of the invention. In the drawing.

Figure 1:
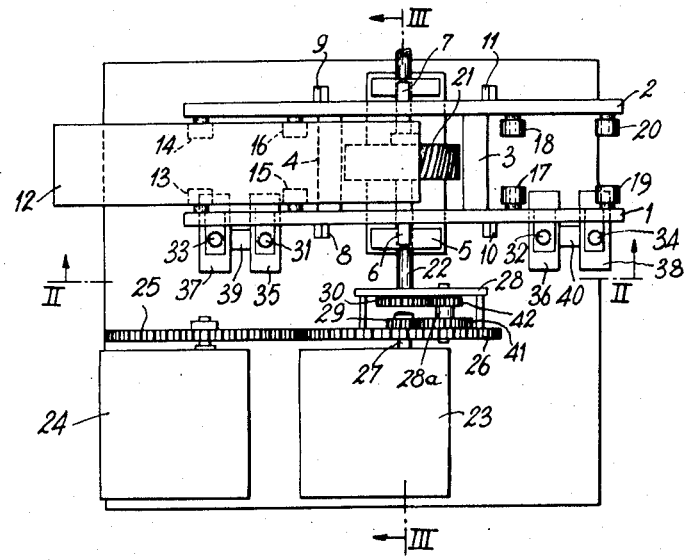
Figure 1 is a plan view.
Figure 2:
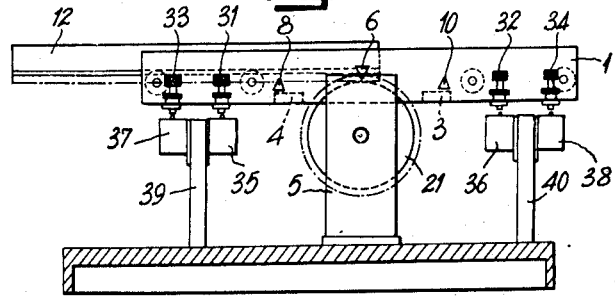
Figure 2 is a vertical section taken upon the line II—II of Fig. 1.
Figure 3:
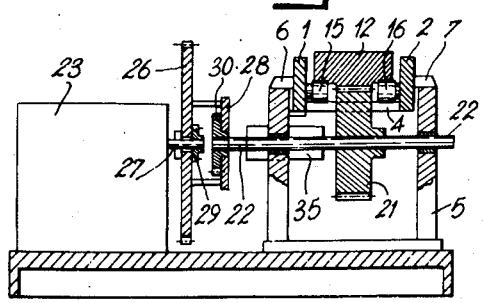
Figure 3 is another vertical section but taken upon the line III—III of Fig. 1.

As illustrated in Figs. 1 to 3, the scale beam consists of a pair of symmetrical side flanges 1, 2 connected by a pair of cross-ties 3, 4. This beam is supported by the frame 5 through the medium of a pair of knives 6, 7 secured on the flanges and having their edges in co-extensive relationship.

The flanges 1, 2 also carry on the one hand a pair of knives 8, 9 supporting the two arms of the load-carrying strap and on the other hand a pair of knives 10, 11 supporting the strap carrying the tare counterweight.

The movable counterweight consists of a girder 12 slidably mounted in the beam through rollers 13 to 20 having their pins secured in the flanges 1, 2, as shown.

The lower face of the counterweight 12 has formed therein a set of skew teeth constituting a rack meshing with the helical gear wheel 21. This wheel 21 is keyed or otherwise secured on a shaft 22 rotating in suitable bearings provided in the frame.

The rotational movement of the toothed wheel 21 which produces the horizontal movement of the counterweight 12, takes place under the influence of two units 23, 24 each consisting of an electromotor coupled with a reducing gear. Both motors are adapted to rotate in either direction and provided with instantaneous stop motions operating upon current breaking.

The output shaft of unit 24 has secured thereon a toothed wheel 25 meshing with a second toothed wheel 26 rotating freely on the output shaft 27 of the other unit 23. This shaft 27 is in axial alignment with the shaft 22.

On the wheel 26 there is secured the planet-carrier 28 of an epicyclic gear having its end wheels 29, 30 keyed on the shafts 27 and 22 respectively, and intermediate wheels 41, 42 mounted for joint rotation on an axle 28a of the carrier 28 and meshing with the wheels 29, 30 respectively.

Four knurled screws 31, 32, 33 and 34 are engaged in supporting brackets connected to the flange 1, these screws overlie four corresponding push-buttons of quick-break switches 35, 36, 37 and 38 mounted by pairs on two columns 39, 40 secured in turn on the frame of the apparatus.

Figure 4:
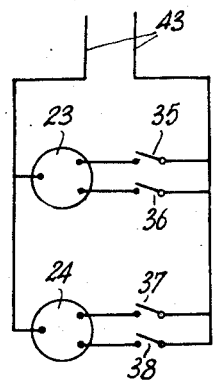
Figure 4 is a wiring diagram.

Fig. 4 illustrates the wiring diagram of the automatic scale, which is described hereafter.

An electric current supply line 43 has one wire connected to the two electromotors of units 23, 24. Each electromotor comprises a two-winding field; when one winding is energized the motor rotates in one direction, and when the other winding is energized the motor rotates in the opposite direction. The pair of switches 35, 36 are inserted in the circuits controlling the field windings of motor 23, and the other pair of switches 37, 38 are inserted in the circuits controlling the field windings of motor 24, as shown.

The scale operates as follows. Under no-load conditions, i. e. when the scale plate is empty, the beam is balanced. The counterweight 12 is in its extreme left-hand position (Fig. 1) corresponding to the zero position of the weight indicator actuated for example by the shaft 22; this counterweight 12 is then balanced by the tare counterweight not shown suspended from the knives 10, 11.

This equilibrium is disturbed when a load is deposited on the plate suspended from the knives 8, 9. The beam will then pivot about its axis and the screws 31, 33 will depress the push-buttons of switches 35, 37. The motors of both units 23, 24 are thus started and rotate in the desired direction so that both toothed wheels 26, 29 rotate in the same direction. On the other hand, the wheel 30 will rotate in the same direction so as to drive the shaft 22 and the helical gear 21 which, by meshing with the rack of girder 12, moves the latter to the right so as to restore the equilibrium of the beam.

Assuming $v_1$ to be the angular speed of rotation of the wheel 29, $v_2$ that of wheel 26, $n$ the differential ratio, i. e. the ratio of the product of the number of teeth of wheels 30, 41 to that of the number of teeth of wheels 42, 29, the velocity $w_1$ of the wheel 30 is given by the equation:

$$w_1 = \frac{v_1}{n} + \frac{n-1}{n} v_2$$

If $v_2 = pv_1$ $$w_1 = \frac{v_1}{n}[(n-1)p + 1]$$

As the counterweight 12 moves nearer to the position corresponding to the balanced condition of the beam, the pressure exerted by the screws 31, 33 on the push buttons of switches 35, 37 decreases, until the pressure exerted on switch 37 equals the release force thereof. Then the switch 37 opens the relevant circuit and stops the motor of unit 24 so that the wheels 25, 26 become stationary. The velocity $v_2$ is now zero and the velocity of wheels 30 and 21 becomes:

$$w_2 = \frac{v_1}{n}$$

By construction, $w_2$ is definitely lower than $w_1$, the ratio between these velocities being $(n-1)p+1$ which may be as desired.

The counterweight 12 will continue its travel at an extremely low speed. When the pressure exerted by the screw 31 equals the release force of switch 35, the latter opens its contacts and stops the motor of unit 23. The counterweight 12 is thus stopped and the weighing operation is ended.

When the load on the scale plate is reduced or removed the equilibrium of the beam is again disturbed but this time the beam leans on the right-hand side and the switches 36, 38 are actuated by the screws 32, 34 so as to energize the motors of units 23 and 24 in the reverse direction and therefore cause the counterweight to travel leftwards until the beam reaches another position of equilibrium.

The angle through which the toothed wheel 21 has rotated from the position corresponding to the empty condition of the scale plate, during the weighing operation, is proportional to the displacement effected by the counterweight 12 and therefore to the weight of the load placed on the plate. A pointer may be secured on the shaft 22 and adapted to move in front of a dial to indicate the load by direct-reading.

However, it will be noted that in this arrangement the power available may be as great as desired, since it is dependent only on the power rating of the motors of units 23 and 24. On the other hand, the position of the counterweight 12 which corresponds to the balanced condition of the beam is independent of the mechanical resistance produced by the devices actuated through the shaft 22.

Consequently, this shaft may be used for controlling:
 (i) A counter-totalizer for adding the successive loads weighed by the machine;
 (ii) A weight-recording device operating automatically upon completion of a weighing operation when the switches 35 and 36 are open in which case these switches must be of the reversing type;
 (iii) A device for integrating the weights of a material conveyed by an endless belt or like conveyor;
 (iv) An output-regulating device;
 (v) A device adapted to sort or separate weighed articles or products by weight categories.

Although the above description and the attached drawing refer to specific form of embodiment of the invention, it will be readily understood that many modifications may be made thereto without departing from the invention as defined by the appended claims.

I claim:
1. An automatic scale comprising a base, a frame mounted on said base, a beam pivotally mounted on said frame with one arm of said beam being adapted to be acted upon by the load to be weighed, a counterweight slidably mounted along said beam for balancing the same, a rack connected to said counterweight and having inclined teeth, a helical gear rotatably mounted on said frame and meshing with said rack for driving said counterweight in either direction while exerting a force thereon passing constantly through the axis of pivoting of said beam, an electric motor, a speed reducing-gear unit carried by said frame and connected to said motor and said helical gear for driving said gear in either direction, a source of electrical current and a plurality of electric switches positioned on said base, means mounted on said beam for actuating said electric switches when said beam is unbalanced and controlling the connection of said motor to said current and thereby the displacement of said counterweight in the direction for restoring the equilibrium of said beam.

2. An automatic scale comprising a base, a frame mounted on said base, a beam pivotally mounted on said frame with one arm of said beam being adapted to support the load to be weighed, a counterweight slidably mounted on said beam, a rack carried by said counterweight and having inclined teeth, a helical gear rotatably supported by said frame and being in meshed engagement with said rack with the point of engagement between the meshing teeth thereof being constantly coincident with the contact generatrix of the pitch circle of said gear and the pitch plane of said rack and with the axis of pivoting of said beam, means for driving said gear in either direction and means operable by said beam controlling said driving means.

3. An automatic scale as claimed in claim 2 wherein said driving means consists of a pair of reversible electric motors, a differential having two driving gears each driven by one of said motors and capable of driving its output shaft in either direction at two different velocities according to whether one or both motors are operating, and said controlling means includes a source of electrical current, four switches connected to said frame and each capable of connecting one of said motors to said current for being energized to rotate in a given direction, and means carried by said beam for operating said switches in accordance with unbalanced conditions of said beam.

References Cited in the file of this patent
UNITED STATES PATENTS

| | | |
|---|---|---|
| 721,469 | Schenck | Feb. 24, 1903 |
| 758,388 | Schenck | Apr. 26, 1904 |
| 785,209 | Hamilton | Mar. 21, 1905 |
| 1,249,487 | Pool | Dec. 11, 1917 |
| 1,347,206 | Buckingham | July 20, 1920 |
| 1,669,519 | Hild | May 15, 1928 |
| 2,741,472 | Thayer et al. | Apr. 10, 1956 |